(12) United States Patent
Jeon (10) Patent No.: US 7,581,392 B2
(45) Date of Patent: Sep. 1, 2009

(54) STRAIGHT TRAVELING HYDRAULIC CIRCUIT

(75) Inventor: Man Suk Jeon, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 267 days.

(21) Appl. No.: 11/821,108

(22) Filed: Jun. 21, 2007

(65) Prior Publication Data

US 2008/0053082 A1 Mar. 6, 2008

(30) Foreign Application Priority Data

Aug. 29, 2006 (KR) ...................... 10-2006-0082262

(51) Int. Cl.
*F16D 31/02* (2006.01)
(52) U.S. Cl. ............................... 60/421; 60/484; 60/486
(58) Field of Classification Search ................... 60/421, 60/429, 484, 486
See application file for complete search history.

(56) References Cited

U.S. PATENT DOCUMENTS

| | | | | | |
|---|---|---|---|---|---|
| 5,692,377 | A | * | 12/1997 | Moriya et al. | 60/421 |
| 6,430,922 | B2 | * | 8/2002 | Tohji | 60/421 |
| 6,708,490 | B2 | * | 3/2004 | Toji et al. | 60/421 |
| 7,178,333 | B2 | * | 2/2007 | Oka | 60/421 |
| 7,412,827 | B2 | * | 8/2008 | Verkuilen | 60/486 |

* cited by examiner

*Primary Examiner*—Michael Leslie
(74) *Attorney, Agent, or Firm*—Ladas & Parry LLP (57) ABSTRACT

A straight traveling hydraulic circuit is disclosed, which, in the case of performing a combined operation in which working and traveling devices are simultaneously driven, can prevent a declination of equipment due to an overload of the working devices. A straight traveling valve is shifted to supply the hydraulic fluid from the first hydraulic pump to the left and right traveling motors and to supply the hydraulic fluid from the second hydraulic pump to the first and second working devices. A control valve connects inlet and outlet parts of the straight traveling valve, and is shifted, when the combined operation is performed, to intercept a supply of the hydraulic fluid from the second hydraulic pump to the traveling motor.

5 Claims, 7 Drawing Sheets

STRAIGHT TRAVELING HYDRAULIC CIRCUIT

CROSS-REFERENCE TO RELATED APPLICATION

This application is based on and claims priority from Korean Patent Application No. 10-2006-82262, filed on Aug. 29, 2006 in the Korean Intellectual Property Office, the disclosure of which is incorporated herein in its entirety by reference.

BACKGROUND OF THE INVENTION

1. Field of the Invention

The present invention relates to a straight traveling hydraulic circuit which can prevent a declination of equipment when traveling devices and working devices are simultaneously driven.

More particularly, the present invention relates to a straight traveling hydraulic circuit, which, in the case of performing a combined operation in which working devices and traveling devices are simultaneously driven, can prevent a declination of equipment due to an overload occurring in the working devices such a boom and so on.

2. Description of the Prior Art

Figure 1:
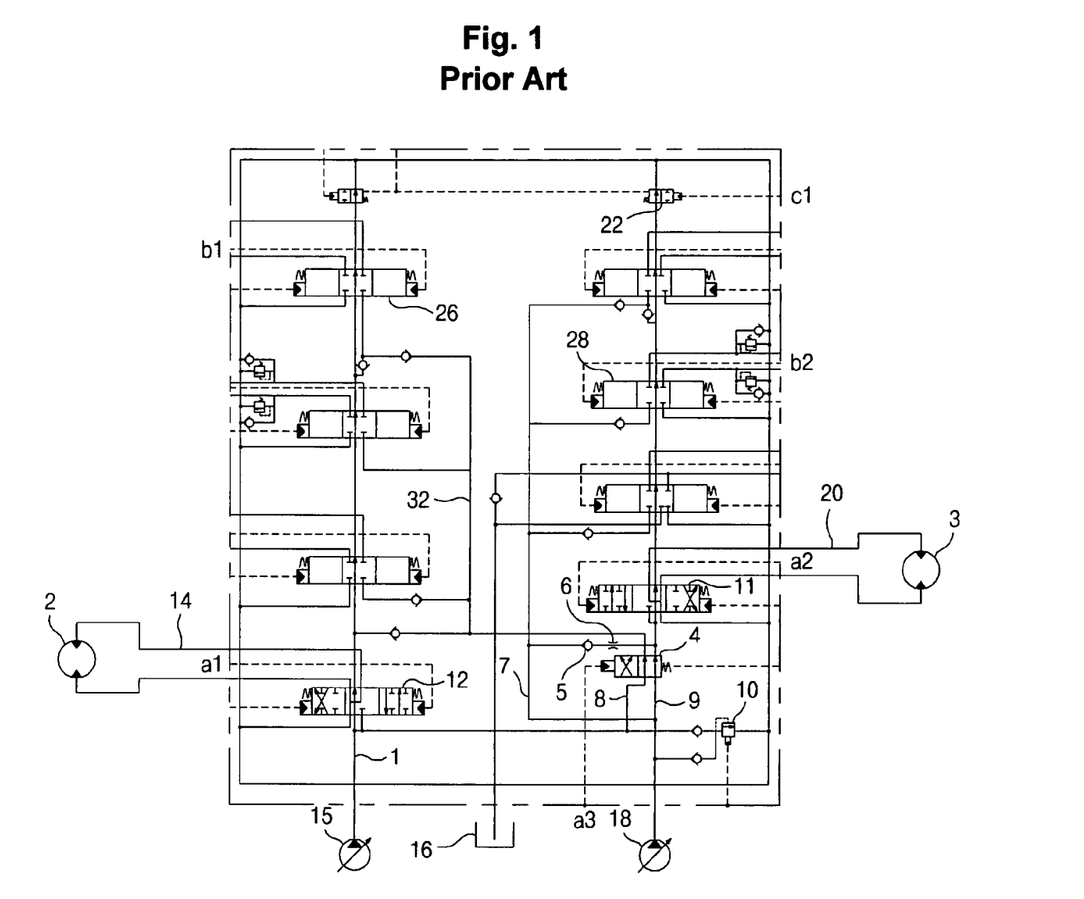
FIG. 1 is a circuit diagram of a conventional straight traveling hydraulic circuit.

As illustrated in FIG. 1, a conventional straight traveling hydraulic circuit includes first and second variable hydraulic pumps 15 and 18; a left traveling motor 2 and a first working device (not illustrated) such as an arm and so on, connected to the first hydraulic pump 15 and driven when hydraulic fluid is fed thereto; a plurality of switching valves 12 and 26 installed in a flow path 1 of the first hydraulic pump 15 and shifted to control the hydraulic fluid fed to the left traveling motor 2 and the first working device in response to pilot signal pressures a1 and b1 applied thereto; a right traveling motor 3 and a second working device (not illustrated) such as a boom and so on, connected to the second hydraulic pump 18 and driven when the hydraulic fluid is fed thereto; a plurality of switching valves 11 and 28 installed in a flow path 9 of the second hydraulic pump 18 and shifted to control the hydraulic fluid fed to the right traveling motor 3 and the second working device in response to pilot signal pressures a2 and b2 applied thereto; and a straight traveling valve 4 installed in the flow path 9 and shifted, in response to a pilot signal pressure a3 applied thereto, to supply the hydraulic fluid fed from the first hydraulic pump 15 to the left and right traveling motors 2 and 3, to supply a part of the hydraulic fluid fed from the second hydraulic pump 18 to a first working device switching valve 26 through a flow path 32, and simultaneously to supply a part of the hydraulic fluid fed from the second hydraulic pump 18 to a second working device switching valve 28 through a flow path 7.

In the drawing, reference numeral 10 denotes a main relief valve that protects a hydraulic system by making a part of the hydraulic fluid drain to a hydraulic tank 16 when an overload that exceeds a predetermined pressure in the hydraulic circuit occurs.

A) In the case of solely performing a traveling operation:

As the pilot signal pressure a1 is applied to the left traveling motor switching valve 12, an inner spool of the switching valve 12 is shifted in the left direction as shown in the drawing. Accordingly, the hydraulic fluid fed from the first hydraulic pump 15 is supplied to the left traveling motor 2 via the flow path 1, the switching valve 12, and a flow path 14.

As the pilot signal pressure a2 is applied to the right traveling motor switching valve 11, an inner spool of the switching valve 11 is shifted in the right direction as shown in the drawing. Accordingly, the hydraulic fluid fed from the second hydraulic pump 18 is supplied to the right traveling motor 3 via the flow path 9, the switching valve 11, and a flow path 20.

That is, in the case of solely driving the left traveling motor 2 or the right traveling motor 3, the hydraulic fluid fed from the first hydraulic pump 15 is supplied to the left traveling motor 2, and the hydraulic fluid fed from the second hydraulic pump 18 is supplied to the right traveling motor 3.

B) In the case of performing a combined operation by simultaneously driving the traveling devices and the working devices:

As the pilot signal pressure a3 is applied to a straight traveling valve 4, an inner spool of the straight traveling valve 4 is shifted in the right direction as shown in the drawing. Simultaneously, as the pilot signal pressure b1 is applied to the first working device switching valve 26, an inner spool of the switching valve 26 is shifted in the left direction as shown in the drawing. Accordingly, a signal pressure c1 is applied to a first center bypass valve 22 to shift an inner spool of the bypass valve 22 in the left direction, and thus a pressure is formed in a first center bypass flow path.

Accordingly, a part of the hydraulic fluid fed from the first hydraulic pump 15 is supplied to the left traveling motor 2 via the flow path 1, the switching valve 12, and the flow path 14. Simultaneously, a part of the hydraulic fluid fed from the first hydraulic pump 15 is supplied to the right traveling motor 3 via a flow path 8, the straight traveling valve 4, the switching valve 11, and the flow path 20.

That is, the hydraulic fluid fed from the first hydraulic pump 15 is used to drive the left traveling motor 2 and the right traveling motor 3.

On the other hand, the hydraulic fluid fed from the second hydraulic pump 18 is supplied to the first working device switching valve 26 via the flow path 9, the straight traveling valve 4, and the flow path 32, to drive the corresponding working devices such as the arm and so on.

That is, the hydraulic fluid fed from the second hydraulic pump 18 is supplied to the first working device switching valve 26 and is used to drive the corresponding devices.

On the above-described condition, if the pressure for shifting the first working device switching valve 26 is gradually increased and its inner spool is shifted to a full-stroke state, the pressure is increased up to a predetermined pressure of the main relief valve 10. In this case, the hydraulic fluid fed from the second hydraulic pump 18 is not supplied to the first working device switching valve 26 any more.

That is, a part of the hydraulic fluid being supplied to the switching valve 26 passes through the flow path 32, the straight traveling valve 4, the flow path 9, and the flow path 7, and then is supplied to the right traveling motor 3 via a check valve 5 an orifice 6. A part of the hydraulic fluid being supplied to the switching valve 26 is supplied to the left traveling motor 2 via the flow path 8.

In this case, the traveling motor switching valves 12 and 11 are shifted in response to the pilot signal pressures a1 and a2 being applied thereto. During the combined operation, the traveling side pilot signal pressure, which is kept about 10~12K, shifts the switching valves 12 and 11. Accordingly, in the case where the traveling motor switching valves 11 and 12 are half shifted, it is possible to control the flow of the hydraulic fluid by a P-N notch (that controls the hydraulic fluid fed from the hydraulic pump to the hydraulic tank), a P-C notch (that controls the hydraulic fluid fed from the hydraulic pump to a hydraulic cylinder), and a C-T notch (that controls the hydraulic fluid fed from the hydraulic cylinder to the hydraulic tank).

In the conventional hydraulic circuit, no hydraulic fluid is fed through the P-N notch when the switching valve 26 and the first center bypass valve 22 are shifted. Accordingly, the hydraulic fluid fed through the switching valves 11 and 12 can be controlled by the P-C notch or the C-T notch.

The spool notches of the traveling motor switching valves 11 and 12 have the same structure. However, due to the difference in accumulated tolerance and processing condition between the spools, it is difficult for the spool notches to keep the same cross-sectional area.

That is, since the flow rate of the hydraulic fluid passing through the spool is in proportion to the cross-sectional area of the spool, the flow rate of the hydraulic fluid passing through the traveling motor switching valve 12 is different from that passing through the traveling motor switching valve 11 when the cross-sectional areas of the spool notches are different from each other. In the case where the flow rates of the traveling motor switching valves 12 and 11 are different from each other, the driving speed of the traveling motor on the side where the flow rate is relatively high becomes abruptly high, whereas the driving speed of the traveling motor on the side where the flow rate is low becomes lowered.

As described above, in the case of performing the combined operation in which the traveling motors 2 and 3 are driven in a state that the spools of the traveling motor switching valves 12 and 11 are half shifted (at this time, the spool of the straight traveling valve 4 is fully shifted), and the working devices such as the boom and so on are driven simultaneously with the traveling devices, a declination of the equipment may occur due to an overload occurring in the working devices.

SUMMARY OF THE INVENTION

Accordingly, the present invention has been made to solve the above-mentioned problems occurring in the prior art while advantages achieved by the prior art are maintained intact.

One object of the present invention is to provide a straight traveling hydraulic circuit, which, in the case of performing a combined operation in which working devices and traveling devices are simultaneously driven, can prevent a declination of equipment due to an overload occurring in the working devices such a boom and so on, and thus improve manipulation of the equipment.

In order to accomplish the object, there is provided a straight traveling hydraulic circuit, according to one aspect of the present invention, which includes first and second variable hydraulic pumps; a left traveling motor and a first working device connected to the first hydraulic pump; a plurality of switching valves installed in a flow path of the first hydraulic pump, and shifted to control hydraulic fluid fed to the left traveling motor and the first working device; a right traveling motor and a second working device connected to the second hydraulic pump; a plurality of switching valves installed in a flow path of the second hydraulic pump, and shifted to control the hydraulic fluid fed to the right traveling motor and the second working device; a straight traveling valve installed in the flow path of the second hydraulic pump, and shifted to supply the hydraulic fluid fed from the first hydraulic pump to the left traveling motor and the right traveling motor and to supply the hydraulic fluid fed from the second hydraulic pump to the first working device and the second working device, respectively; and a control valve installed in a branch flow path, which is branched from the flow path of the second hydraulic pump and connects an inlet part with an outlet part of the straight traveling valve, and shifted, when a combined operation in which the traveling and working devices are simultaneously driven is performed, to intercept a supply of the hydraulic fluid from the second hydraulic pump to the traveling motor via the straight traveling valve.

The control valve may include a main valve composed of a poppet having a flow path connected to a flow path on an inlet side of the traveling switching valve and opening/closing the branch flow path, a piston pressing the poppet to block the branch flow path when a signal pressure is applied from an outside, and an elastic member elastically supported between the poppet and the piston and elastically biasing the pilot poppet, which has been pressed to block the branch flow path, to its initial state; and an auxiliary valve composed of a spool shifted to supply the hydraulic fluid on the inlet side of the straight traveling valve to the piston as a signal pressure, in response to a pilot signal pressure being supplied thereto, and a valve spring elastically biasing the spool, which has intercepted the supply of the hydraulic fluid on the inlet side of the straight traveling valve to the piston as the signal pressure, to its initial state.

The straight traveling hydraulic circuit according to embodiments of the present invention may further include at least one orifice formed on a periphery of the poppet of the main valve in the form of a step and serving as a damper when the branch flow path is blocked by bringing the poppet into contact with a seat.

The straight traveling hydraulic circuit according to embodiments of the present invention may further include a check valve installed in a flow path branched from the flow path on the inlet side of the straight traveling valve and supplying the signal pressure to the piston of the main valve.

The straight traveling hydraulic circuit according to embodiments of the present invention may further include an orifice installed in the branch flow path between a flow path on the outlet side of the straight traveling valve and the main valve.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

As shown in FIGS. 2 to 7, the straight traveling hydraulic circuit according to an embodiment of the present invention includes first and second variable hydraulic pumps 15 and 18; a left traveling motor 2 and a first working device such as an arm (not illustrated) and so on, connected to the first hydraulic pump 15; a plurality of switching valves 12 and 26 installed in a flow path 1 of the first hydraulic pump 15, and shifted to control hydraulic fluid fed to the left traveling motor 2 and the first working device, respectively, in response to pilot signal pressures a1 and b1 being applied thereto; a right traveling motor 3 and a second working device such as a boom and so on, connected to the second hydraulic pump 18; a plurality of switching valves 11 and 28 installed in a flow path 9 of the second hydraulic pump 18, and shifted to control the hydraulic fluid fed to the right traveling motor 3 and the second working device, respectively, in response to pilot signal pressures a2 and b2 being applied thereto; a straight traveling valve 4 installed in the flow path 9 of the second hydraulic pump 18, and shifted to supply the hydraulic fluid fed from the first hydraulic pump 15 to the left traveling motor 2 and the right traveling motor 3 and to supply the hydraulic fluid fed from the second hydraulic pump 18 to the first working device and the second working device, respectively, in response to a pilot signal pressure a3 being applied thereto; and a control valve 31 installed in a branch flow path 7-1, which is branched from the flow path 9 of the second hydraulic pump 18 and connects an inlet part with an outlet part of the straight traveling valve, and shifted, when a combined operation in which the traveling and working devices are simultaneously driven is performed, to intercept a supply of the hydraulic fluid from the second hydraulic pump 18 to the left traveling motor 2 and the right traveling motor 3 via the straight traveling valve 4.

Figure 2:
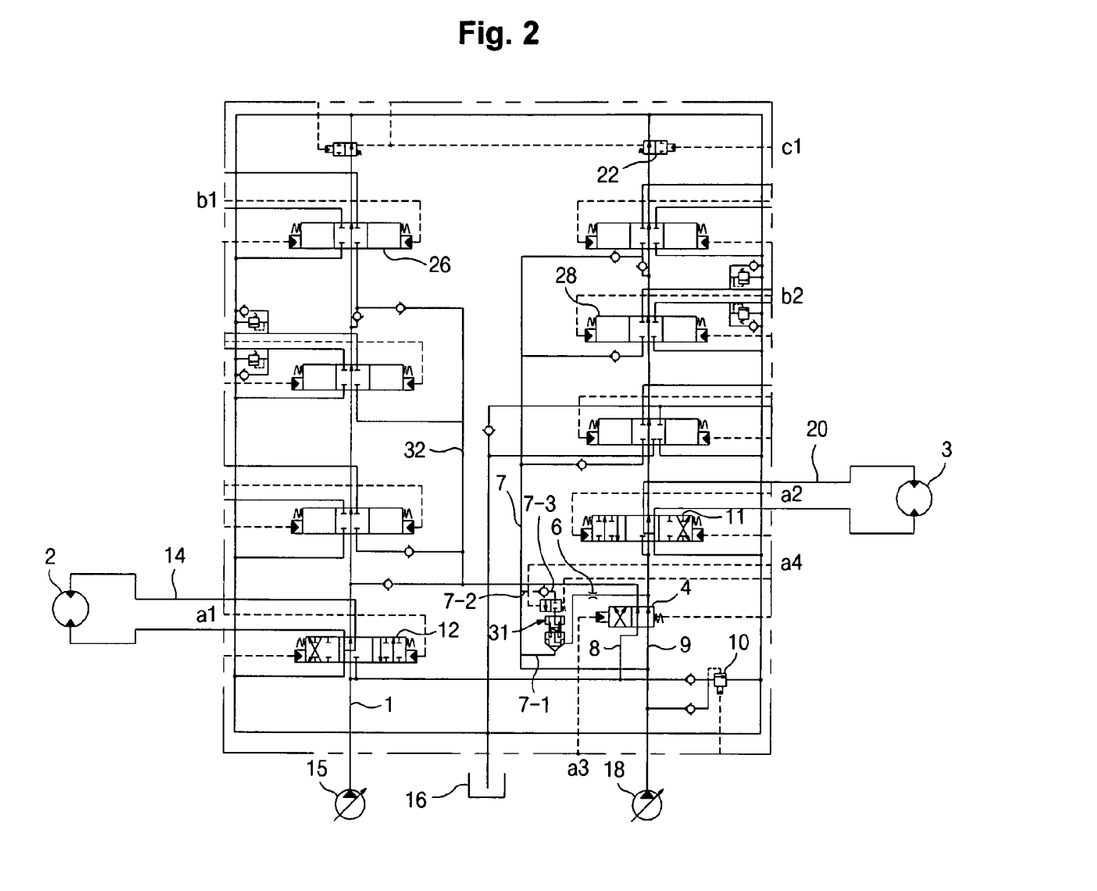
FIG. 2 is a circuit diagram of a straight traveling hydraulic circuit according to an embodiment of the present invention.
Figure 3:
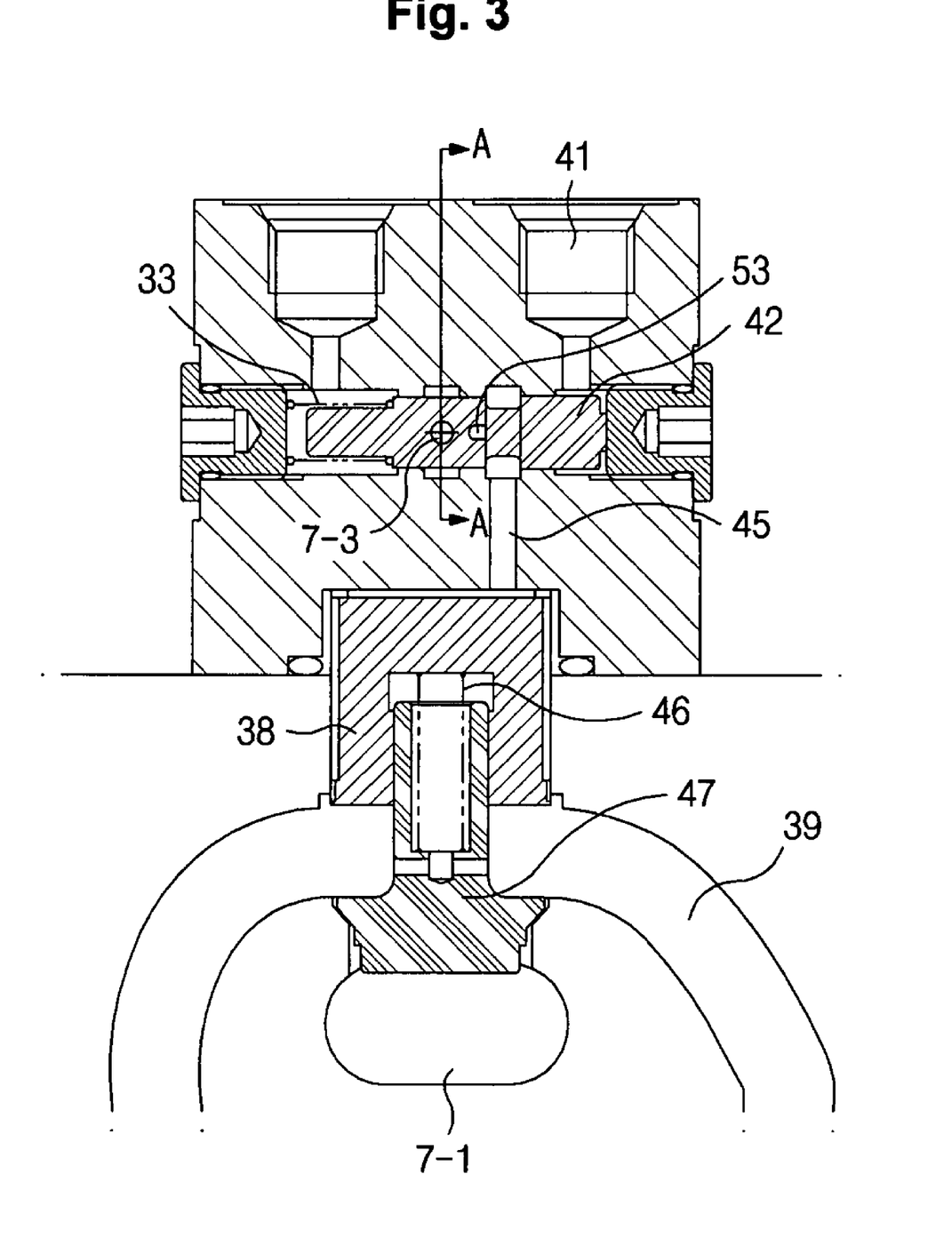
FIG. 3 is a sectional view of a control valve included in the straight traveling hydraulic circuit according to an embodiment of the present invention.

In an embodiment of the present invention, the control valve 31 includes a main valve 31a composed of a poppet 47 having a flow path connected to a flow path on an inlet side of the traveling switching valve 11 and opening/closing the branch flow path, a piston 38 pressing the poppet 47 to block the branch flow path 7-1 when a signal pressure is applied from an outside, and an elastic member 46 (e.g., compression coil spring) elastically supported between the poppet 47 and the piston 38 and elastically biasing the pilot poppet 47, which has been pressed to block the branch flow path 7-1, to its initial state; and an auxiliary valve 31b composed of a spool 42 shifted to supply the hydraulic fluid on the inlet side of the straight traveling valve 4 to the piston 38 as a signal pressure, in response to a pilot signal pressure a4 being supplied thereto, and a valve spring 33 elastically biasing the spool 42, which has intercepted the supply of the hydraulic fluid on the inlet side of the straight traveling valve 4 to the piston 38 as the signal pressure, to its initial state.

Figure 6:
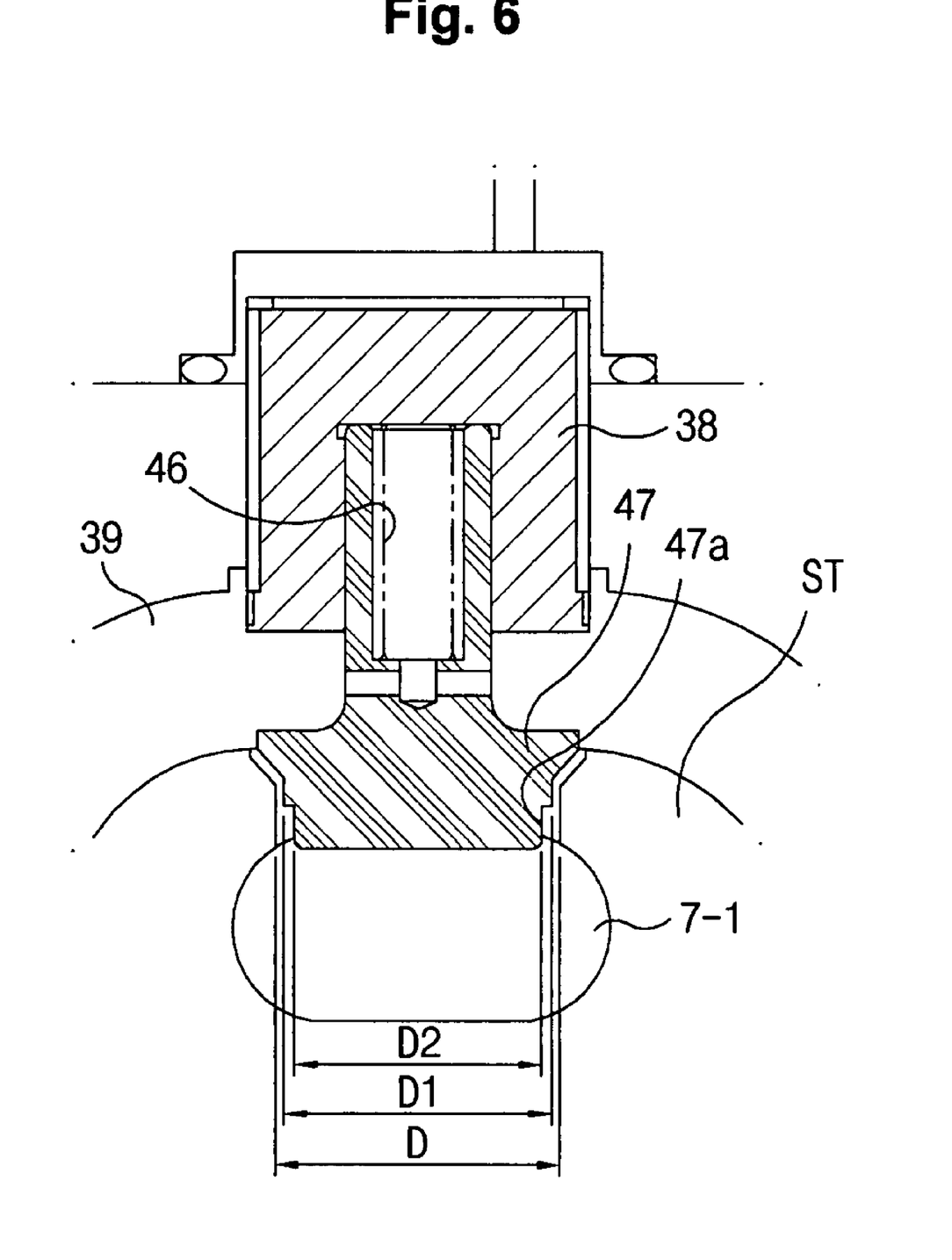
FIG. 6 is a detailed sectional view of an orifice part illustrated in FIG. 3.

The straight traveling hydraulic circuit according to an embodiment of the present invention further includes at least one orifice 47a formed on a periphery of the poppet 47 of the main valve 31a in the form of a step and serving as a damper when the branch flow path 7-1 is blocked by bringing the poppet 47 into contact with a seat ST.

Figure 4:
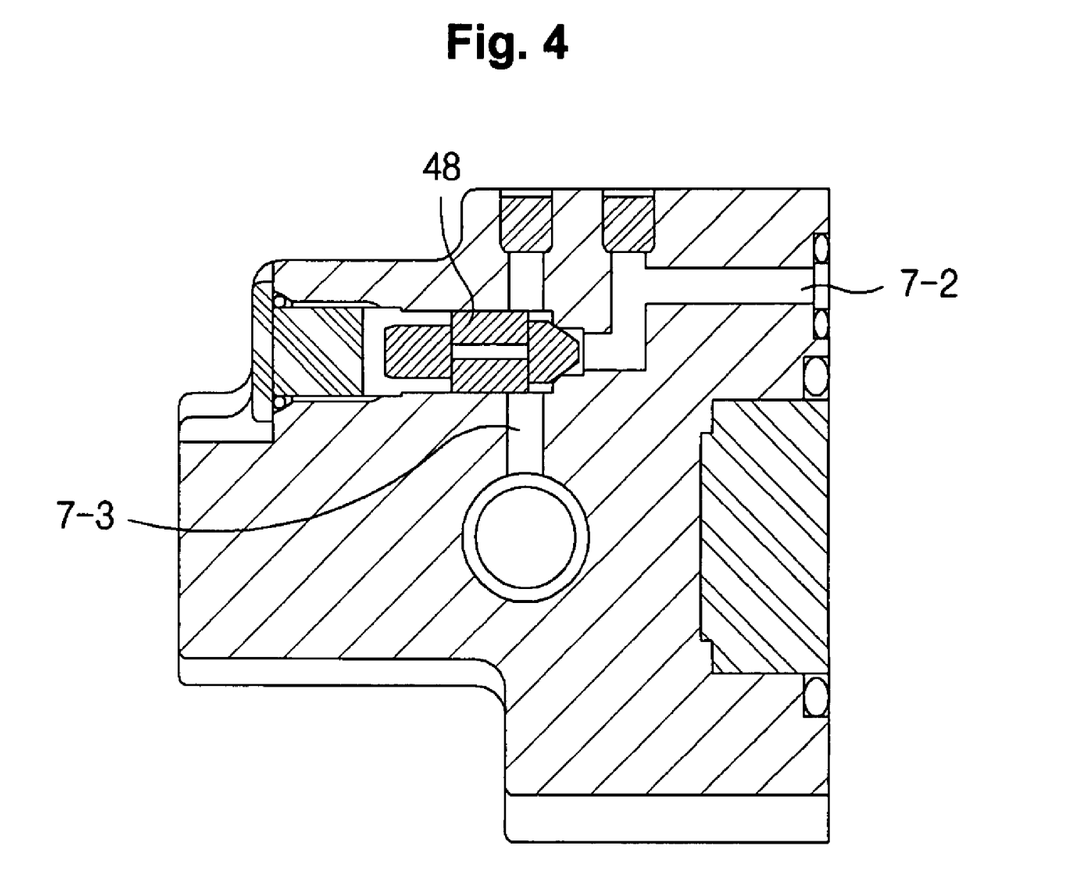
FIG. 4 is a sectional view of the control valve taken along A-A line of FIG. 3.

The straight traveling hydraulic circuit according to an embodiment of the present invention further includes a check valve 48 installed in a flow path branched from the flow path on the inlet side of the straight traveling valve 4 and supplying the signal pressure to the piston 38 of the main valve 31a.

The straight traveling hydraulic circuit according to an embodiment of the present invention further includes an orifice 6 installed in the branch flow path 7-1 between a flow path on the outlet side of the straight traveling valve 4 and the main valve 31a.

In the whole description of the present invention, the same drawing reference numerals as illustrated in FIG. 1 are used for the same elements across various figures, and the detailed description thereof will be omitted.

Hereinafter, the operation of the straight traveling hydraulic circuit according to an embodiment of the present invention will be described with reference to the accompanying drawings.

A) In the case of solely performing a traveling operation:

By the pilot signal pressure a1 that is applied to the left traveling motor switching valve 12, an inner spool of the switching valve 12 is shifted in the left direction as shown in the drawing. Accordingly, the hydraulic fluid fed from the first hydraulic pump 15 is supplied to the left traveling motor 2 via the flow path 1, the switching valve 12, and a flow path 14.

On the other hand, by the pilot signal pressure a2 that is applied to the right traveling motor switching valve 11, an inner spool of the switching valve 11 is shifted in the right direction as shown in the drawing. Accordingly, the hydraulic fluid fed from the second hydraulic pump 18 is supplied to the right traveling motor 3 via the flow path 9, the switching valve 11, and a flow path 20.

That is, in the case of solely driving the left traveling motor 2 or the right traveling motor 3, the left traveling motor 2 is driven by the hydraulic fluid fed from the first hydraulic pump 15, and the right traveling motor 3 is driven by the hydraulic fluid fed from the second hydraulic pump 18.

B) In the case of performing a combined operation by simultaneously driving the traveling devices and the working devices:

By the pilot signal pressure a3 of about 40K that is applied to a straight traveling valve 4, an inner spool of the straight traveling valve 4 is shifted in the right direction as shown in the drawing. Simultaneously, by the pilot signal pressure b1 that is applied to a first working device switching valve 26, an inner spool of the switching valve 26 is shifted in the left direction as shown in the drawing. Also, by a signal pressure c1 applied to a first center bypass valve 22, an inner spool of the bypass valve 22 is shifted in the left direction, and thus a pressure is formed in a first center bypass flow path.

Figure 5:
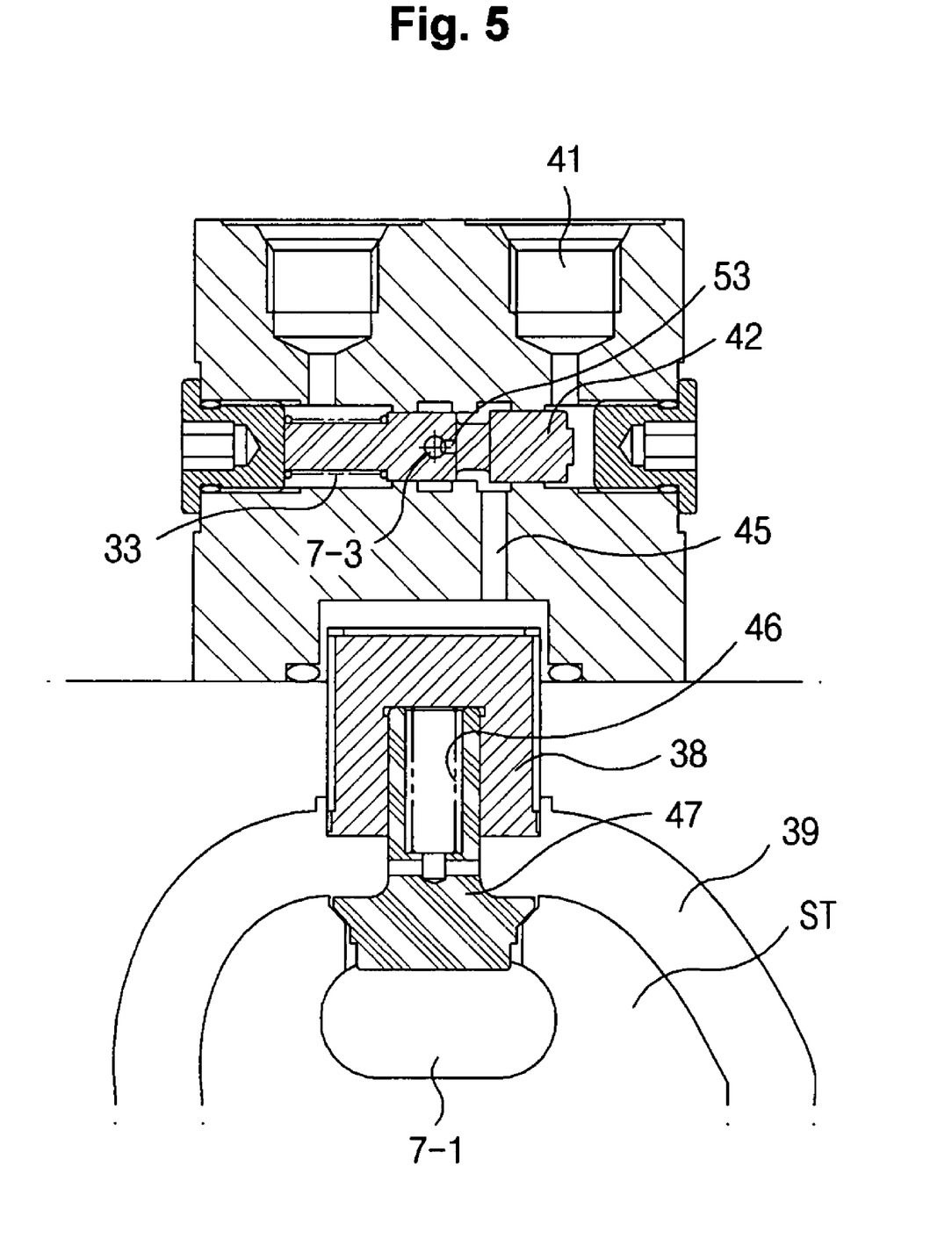
FIG. 5 is a sectional view of the control valve of FIG. 3 in a used state.
Figure 7:
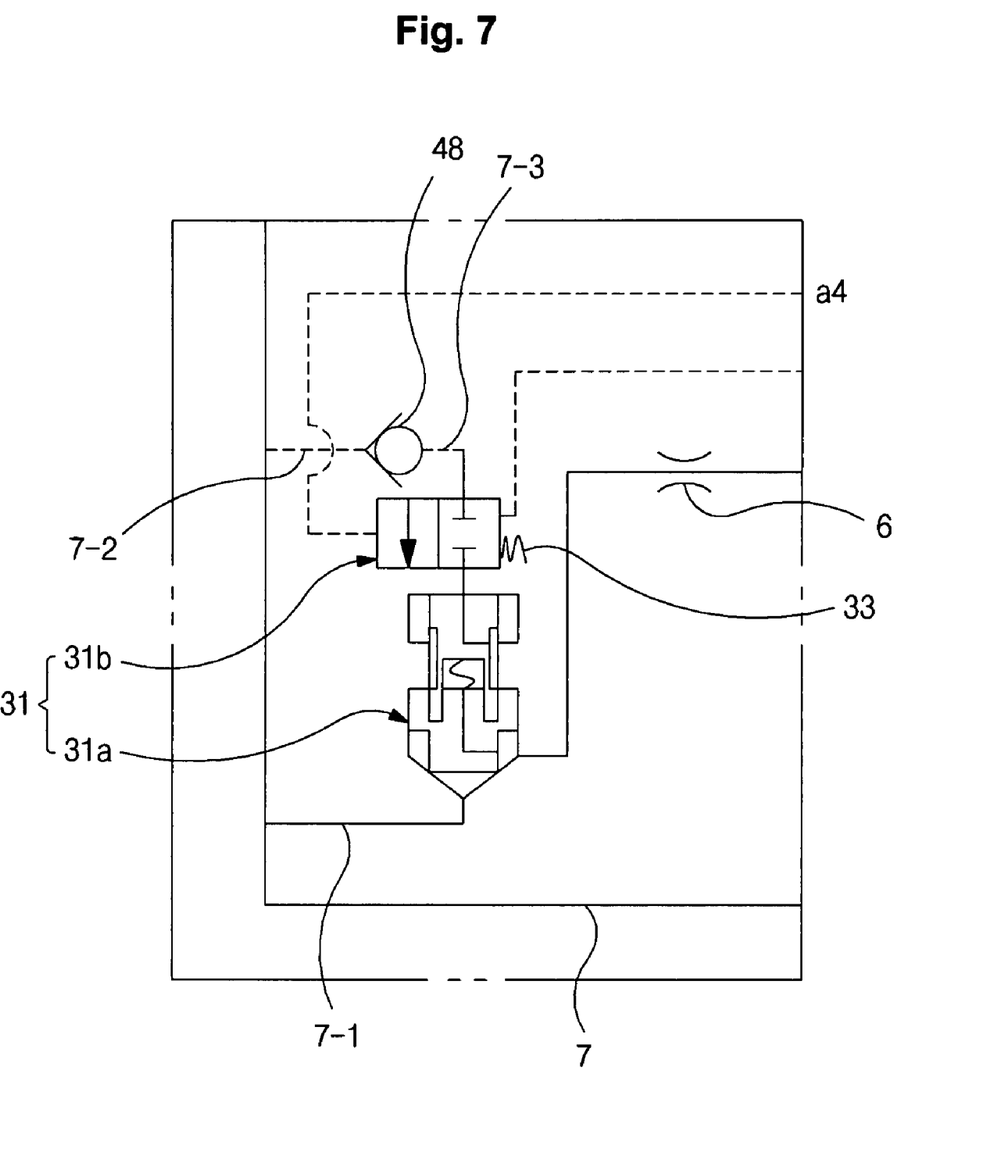
FIG. 7 is a view illustrating main parts of the straight traveling hydraulic circuit according to an embodiment of the present invention.

On the other hand, by the pilot signal pressure a4 of about 40K that is applied to an auxiliary valve 31b, an inner spool 42 of the straight traveling valve 4 is shifted in the right direction as shown in FIG. 7 (whereas the spool 42 is shifted in the left direction in FIG. 5). In this case, the valve spring receives a compression force.

Accordingly, a part of the hydraulic fluid fed from the first hydraulic pump 15 is supplied to the left traveling motor 2 via the flow path 1, the switching valve 12, and the flow path 14. Simultaneously, a part of the hydraulic fluid fed from the first hydraulic pump 15 is supplied to the right traveling motor 3 via a flow path 8, the straight traveling valve 4, the switching valve 11, and the flow path 20.

That is, the hydraulic fluid fed from the first hydraulic pump 15 is used to drive the left traveling motor 2 and the right traveling motor 3.

Simultaneously, the hydraulic fluid fed from the second hydraulic pump 18 is supplied to the first working device switching valve 26 via the flow path 9, the straight traveling valve 4, and the flow path 32, to drive the corresponding working devices such as the arm and so on.

That is, the hydraulic fluid fed from the second hydraulic pump 18 is supplied to the first working device switching valve 26 and is used to drive the corresponding devices.

On the above-described condition, if the pressure for shifting the first working device switching valve 26 is gradually increased and its inner spool is shifted to a full-stroke state, the pressure is increased up to a predetermined pressure of the main relief valve 10. In this case, the hydraulic fluid fed from the second hydraulic pump 18 is not supplied to the first working device switching valve 26 any more.

That is, a part of the hydraulic fluid being fed from the second hydraulic pump 18 to the switching valve 26 is supplied to a flow path 7 via the flow path 32, the straight traveling valve 4, and the flow path 9. The hydraulic fluid having been supplied to the flow path 7 passes in turn through a poppet 47 of a control valve 31 installed in the branch flow path 7-1 connecting the outlet of the straight traveling valve 4 to the flow path 7, and an orifice 6.

That is, if the hydraulic fluid fed from the second hydraulic pump 18 is supplied to the branch flow path 7-1 through the flow path 7, it pushes the poppet 47 as illustrated in FIG. 3 upward to open the branch flow path 7-1. The hydraulic fluid in a flow path 7-2 that is branched from the flow path 7 is supplied to the flow path 7-3 through a check valve 48 as illustrated in FIG. 4. In this case, the hydraulic fluid in the flow path 7-3 is intercepted by the spool 42 as illustrated in FIG. 3.

More specifically, a part of the hydraulic fluid fed from the second hydraulic pump 18 is supplied to the right traveling motor 3 via the traveling switching valve 11, and simultaneously, a part of the hydraulic fluid fed from the second hydraulic pump 18 is supplied to the left traveling motor 2 through a flow path 8.

In this case, the pilot signal pressure a4 is applied to the auxiliary valve 31*b* through a port 41, and thus the inner spool 42 is shifted in the right direction as shown in FIG. 7 (whereas the spool 42 is shifted in the left direction in FIG. 5). Accordingly, the hydraulic fluid fed from the second hydraulic pump 18 is supplied to the flow path 7 through the control valve, the straight traveling valve 4, and the flow path 9 in turn.

In this case, the branch flow path 7-1 branched from the flow path 7 is blocked by the control valve 31. That is, the hydraulic fluid in the second hydraulic pump 18, having been supplied to the flow path 7, is intercepted from being supplied to the left traveling motor 2 or the right traveling motor 3 by the control valve 31.

As described above, in the case of performing the combined operation by simultaneously driving the traveling devices and the working devices, the hydraulic fluid fed from the first hydraulic pump 15 is supplied to the left traveling motor 2 and the right traveling motor 3 to drive the equipment, but the hydraulic fluid fed from the second hydraulic pump 18 is not supplied to the left traveling motor 2 or the right traveling motor 3.

Now, the operation of the control valve 31 will be described in detail.

As illustrated in FIGS. 3, 5, and 7, when the pilot signal pressure a4 is applied to the port 41, the spool 42 is shifted in the left direction as shown in the drawing (whereas, in FIG. 5, the spool is shifted in the right direction). In this case, the standby hydraulic fluid in the flow path 7-3 presses the piston 38 after it passes through a flow path 45 that is controlled by a notch 53 of the spool 42, and thus the piston 38 is moved downward.

Specifically, when the piston 38 is pressed, it is moved downward to block the branch flow path 7-1. Accordingly, the flow path connected from the branch flow path 7-1 to the inlet side of the traveling switching valve 11 is blocked as illustrated in FIG. 5.

On the other hand, as illustrated in FIG. 6, at least one orifice 47*a* in the form of a step is formed on the periphery of the poppet 47 (in FIG. 6, two orifices are illustrated). Accordingly, the poppet 47 is prevented from being damaged due to a shock given when the poppet becomes in contact with the seat ST by a strong pressure that is applied to the piston 38.

Specifically, when the piston 38 and the poppet 47 are half stroked, the pressure in the branch flow path 7-1 is increased up to the predetermined pressure of the main relief valve 10 by an orifice 47*a* formed on the periphery of the poppet as illustrated in FIG. 6 (which corresponds to a gap between an inner diameter D of the seat ST and a second outer diameter D2 of the poppet 47, or a gap between the inner diameter D of the seat ST and a second outer diameter D2 of the poppet 47). Accordingly, the orifice 47*a* serves as a damper that forms a reaction force in the branch flow path 7-1 to counteract the pressure being applied during the descending of the poppet 47.

In other words, by blocking the branch flow path 7-1 through the contact of the poppet 47 with the seat ST after a half damping is given to the poppet 47 that becomes in contact with the seat ST, or by passing extremely a part of the hydraulic fluid through a minute opening between the seat ST and the poppet 47, a shock given when the poppet 47 becomes in contact with the seat ST is reduced, and thus the poppet 47 is prevented from being damaged.

On the other hand, the traveling motor switching valves 12 and 11 are shifted in response to the pilot signal pressures a1 and a2 being applied thereto. During the combined operation, the traveling side pilot signal pressure, which is kept about 10~12K, shifts the switching valves 12 and 11. Accordingly, in the case where the traveling motor switching valves 12 and 11 are half shifted, it is possible to control the flow of the hydraulic fluid by a P-N notch (that controls the hydraulic fluid fed from the hydraulic pump to the hydraulic tank), a P-C notch (that controls the hydraulic fluid fed from the hydraulic pump to the hydraulic cylinder), and a C-T notch (that controls the hydraulic fluid fed from the hydraulic cylinder to the hydraulic tank).

In the case where the first working device switching valve 26 and the first center bypass valve 22 are shifted, no hydraulic fluid is fed through the P-N notch. Accordingly, the hydraulic fluid fed through the switching traveling motor switching valves 12 and 11 can be controlled by the P-C notch or the C-T notch.

The spool notches of the traveling motor switching valves 11 and 12 have the same structure, but due to the difference in accumulated tolerance and processing condition between the spools, it is difficult for the spool notches to keep the same cross-sectional area. However, even in the case where the spool notches have different cross-sectional areas, a declination of the equipment can be prevented from occurring by intercepting the supply of the hydraulic fluid from the second hydraulic pump 18 to the left traveling motor 2 or the right traveling motor 3 under the control of the control valve 31.

As described above, the straight traveling hydraulic circuit according to the present invention has the following advantages.

In the case of performing a combined operation in which working devices and traveling devices are simultaneously driven, a declination of the equipment that occurs due to an overload occurring in the working devices such the boom and so on can be prevented, and thus the manipulation and stability of the equipment can be improved.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A straight traveling hydraulic circuit comprising:
   first and second variable hydraulic pumps;
   a left traveling motor and a first working device connected to the first hydraulic pump;
   a plurality of switching valves installed in a flow path of the first hydraulic pump, and shifted to control hydraulic fluid fed to the left traveling motor and the first working device;
   a right traveling motor and a second working device connected to the second hydraulic pump;
   a plurality of switching valves installed in a flow path of the second hydraulic pump, and shifted to control the hydraulic fluid fed to the right traveling motor and the second working device;
   a straight traveling valve installed in the flow path of the second hydraulic pump, and shifted to supply the hydraulic fluid fed from the first hydraulic pump to the left traveling motor and the right traveling motor and to supply the hydraulic fluid fed from the second hydraulic pump to the first working device and the second working device, respectively; and
   a control valve installed in a branch flow path, which is branched from the flow path of the second hydraulic pump and connects an inlet part with an outlet part of the straight traveling valve, and shifted, when a combined operation in which the traveling and working devices are simultaneously driven is performed, to intercept a supply of the hydraulic fluid from the second hydraulic pump to the traveling motor via the straight traveling valve.

2. The straight traveling hydraulic circuit of claim 1, wherein the control valve comprises:
   a main valve composed of a poppet having a flow path connected to a flow path on an inlet side of the traveling switching valve and opening/closing the branch flow path, a piston pressing the poppet to block the branch flow path when a signal pressure is applied from an outside, and an elastic member elastically supported between the poppet and the piston and elastically biasing the pilot poppet, which has been pressed to block the branch flow path, to its initial state; and
   an auxiliary valve composed of a spool shifted to supply the hydraulic fluid on the inlet side of the straight traveling valve to the piston as a signal pressure, in response to a pilot signal pressure being supplied thereto, and a valve spring elastically biasing the spool, which has intercepted the supply of the hydraulic fluid on the inlet side of the straight traveling valve to the piston as the signal pressure, to its initial state.

3. The straight traveling hydraulic circuit of claim 2, further comprising at least one orifice formed on a periphery of the poppet of the main valve in the form of a step and serving as a damper when the branch flow path is blocked by bringing the poppet into contact with a seat.

4. The straight traveling hydraulic circuit of claim 2, further comprising a check valve installed in a flow path branched from the flow path on the inlet side of the straight traveling valve and supplying the signal pressure to the piston of the main valve.

5. The straight traveling hydraulic circuit of claim 2, further comprising an orifice installed in the branch flow path between a flow path on the outlet side of the straight traveling valve and the main valve.

* * * * *